United States Patent
Parker

(10) Patent No.: US 10,209,532 B2
(45) Date of Patent: Feb. 19, 2019

(54) SWITCHABLE FACEMASK FOR SIMULATING SMOKE

(71) Applicant: Jonathan MacDonald Parker, Vernon, NJ (US)

(72) Inventor: Jonathan MacDonald Parker, Vernon, NJ (US)

(*) Notice: Subject to any disclaimer, the term of this patent is extended or adjusted under 35 U.S.C. 154(b) by 165 days.

(21) Appl. No.: 14/643,330

(22) Filed: Mar. 10, 2015

(65) Prior Publication Data

US 2015/0277163 A1    Oct. 1, 2015

Related U.S. Application Data

(60) Provisional application No. 61/972,756, filed on Mar. 31, 2014.

(51) Int. Cl.
| | |
|---|---|
| *G02C 7/02* | (2006.01) |
| *G02C 7/10* | (2006.01) |
| *G09B 19/00* | (2006.01) |
| *G02F 1/1334* | (2006.01) |

(52) U.S. Cl.
CPC ............ *G02C 7/02* (2013.01); *G02C 7/10* (2013.01); *G02C 7/101* (2013.01); *G09B 19/00* (2013.01); *G02F 1/1334* (2013.01)

(58) Field of Classification Search
CPC ....... G02F 1/137; G02F 1/1334; G09B 19/00; G02C 7/02; G02C 7/10; G02C 7/101
See application file for complete search history.

(56) References Cited

U.S. PATENT DOCUMENTS

| | | |
|---|---|---|
| 3,287,828 A | 11/1966 | Cumming |
| 3,436,840 A | 4/1969 | Noxon |
| 3,873,804 A | 3/1975 | Gordon |
| 3,942,270 A | 3/1976 | Hoyt et al. |
| 4,021,935 A | 5/1977 | Witt |
| 4,039,254 A | 8/1977 | Harsch |
| 4,106,217 A | 8/1978 | Witt |
| 4,152,846 A | 5/1979 | Witt |
| 4,482,326 A | 11/1984 | Witt |

(Continued)

FOREIGN PATENT DOCUMENTS

| | | |
|---|---|---|
| EP | 0349665 | 1/1990 |
| FR | 2349122 | 11/1977 |

OTHER PUBLICATIONS

ISA/US, International Search Report and Written Opinion of the International Searching Authority, PCT/US2015/19687, dated Jul. 22, 2015.

*Primary Examiner* — Hoan C Nguyen

(74) *Attorney, Agent, or Firm* — Shlesinger Arkwright & Garvey LLP

(57) ABSTRACT

A switchable facemask comprises a viewing window through which a user views the outside, the viewing window including a clear member; a film operably disposed across the clear member to cover the user's field of view; a power source operably connected to the film; and a switch for turning ON or OFF the power source. The film is switchable between a clear state such that the user can see through the clear member and a light obscuring state such that the user's field of view is obscured. The film is in one of the clear and light obscuring states when the switch is ON and the film is in another of the clear and light obscuring states when the switch is OFF.

21 Claims, 4 Drawing Sheets

(56) References Cited

U.S. PATENT DOCUMENTS

| | | | |
|---|---|---|---|
| 5,660,549 A * | 8/1997 | Witt, III | G09B 9/00 434/21 |
| 6,687,910 B1 | 2/2004 | Smallwood | |
| 7,477,330 B2 | 1/2009 | Magnusson et al. | |
| 8,411,214 B2 | 4/2013 | Chapman et al. | |
| 2005/0151888 A1 | 7/2005 | Loewenthal | |
| 2007/0132929 A1* | 6/2007 | Kataoka | G02F 1/133707 349/123 |
| 2009/0317773 A1 | 12/2009 | Chapman et al. | |
| 2011/0032476 A1 | 2/2011 | Brown et al. | |
| 2011/0183304 A1* | 7/2011 | Wallace | G09B 19/24 434/234 |
| 2011/0283431 A1 | 11/2011 | Miller, IV et al. | |
| 2012/0194553 A1* | 8/2012 | Osterhout | G02B 27/0093 345/633 |
| 2013/0027655 A1* | 1/2013 | Blum | G02C 7/083 349/193 |
| 2013/0235286 A1 | 9/2013 | Hung | |
| 2016/0209648 A1* | 7/2016 | Haddick | G02B 27/0093 |

\* cited by examiner

FIG. 1
FIG. 2
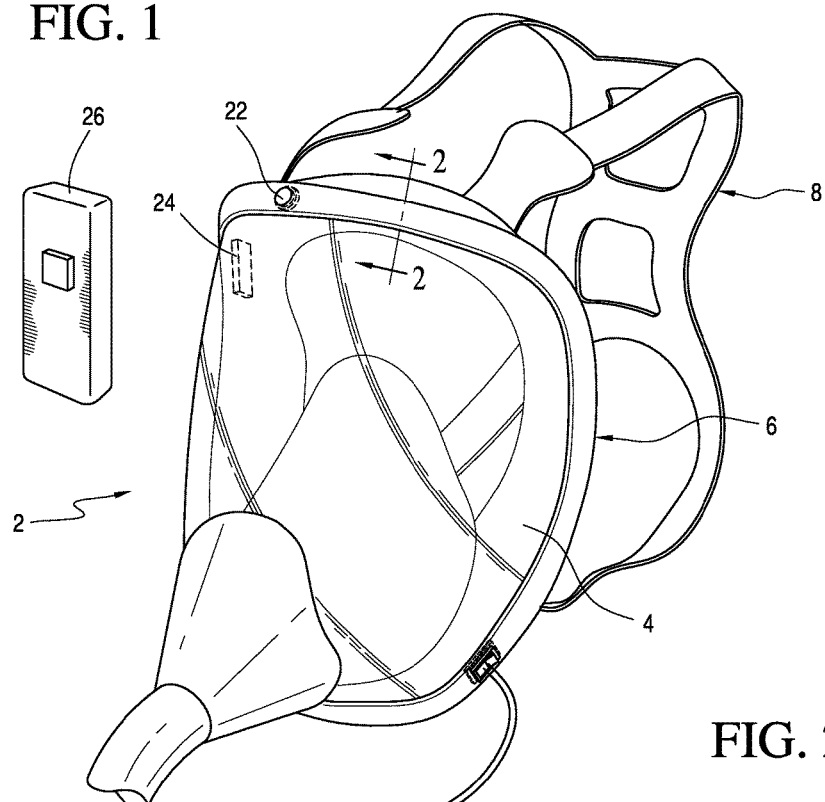
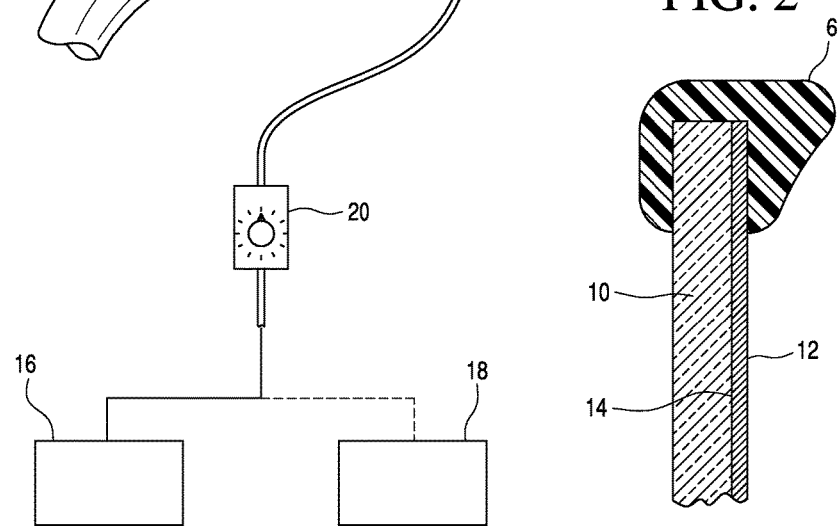

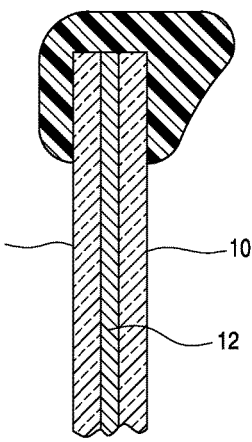
FIG. 3
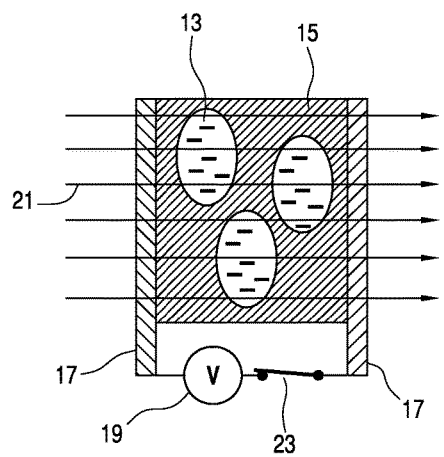 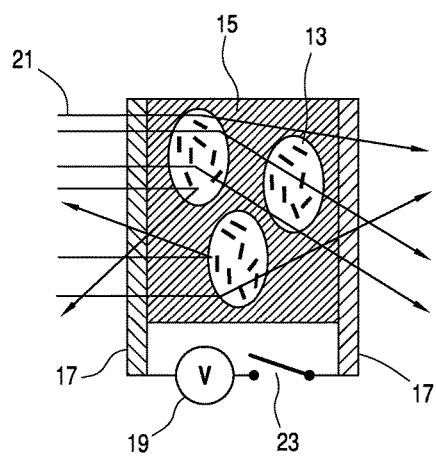
FIG. 4　　　　　　FIG. 5

SWITCHABLE FACEMASK FOR SIMULATING SMOKE

RELATED APPLICATION

This is a nonprovisional application of provisional application Ser. No. 61/972,756, filed Mar. 31, 2014, hereby incorporated by reference.

FIELD OF THE INVENTION

The present invention is generally directed to a facemask for training a user to operate under conditions of smoke in the environment, and particularly to a training facemask that simulates the vision obscuring conditions of smoke.

SUMMARY OF THE INVENTION

The present invention provides a present invention provides a switchable facemask, comprising a viewing window through which a user views the outside, the viewing window including a clear member; a film operably disposed across the clear member to cover the user's field of view; a power source operably connected to the film; and a switch for turning ON or OFF the power source. The film is switchable between a clear state such that the user can see through the clear member and a light obscuring state such that the user's field of view is obscured. The film is in one of the clear and light obscuring states when the switch is ON and the film is in another of the clear and light obscuring states when the switch is OFF.

The present invention also provides a method for training a person under conditions of smoke in an environment, comprising the steps of a) providing a facemask for the person to wear, said facemask including a viewing window switchable between a clear state and a light obscuring state and an electric switch for electrically switching between said clear state and said light obscuring state, said electric switch being remote from the person; and switching the facemask to said light obscuring state to simulate smoke.

BRIEF DESCRIPTION OF THE DRAWINGS

FIG. 1 is a perspective view of a switchable facemask made in accordance with the present invention.

FIG. 2 is a cross-section along line 2-2 of FIG. 1.

FIG. 3 is a cross-section similar to FIG. 2, showing another embodiment of present invention.

FIG. 4 is schematic cross-section of a film used in the facemask of FIG. 1, showing light transmission when power is applied across the film.

FIG. 5 is a schematic cross-section of a film used in the facemask of FIG. 1, showing light reflectance and dispersion when power is cut-off across the film.

DETAILED DESCRIPTION OF THE INVENTION

Figure 6:
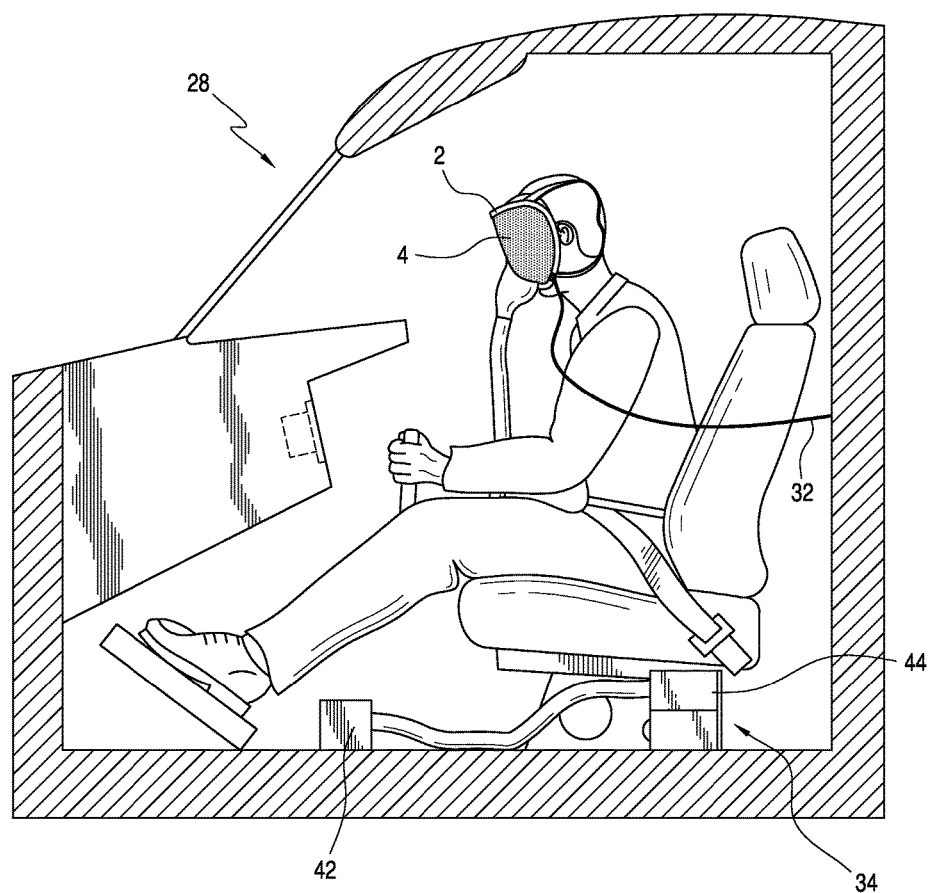
FIG. 6 is schematic view of a flight simulator showing the facemask of FIG. 1 in a smoke-simulating mode.

Referring to FIG. 1, a facemask 2 embodying the present invention is disclosed. The facemask 2 includes a viewing window 4 through which a user is able to see outside the facemask through the user's field of view. A frame or support 6 holds the window 4 and provides a seal around the face of the user. Straps 8 are attached to the frame 6 to secure the facemask 2 to the face of the user. The facemask 2 may be sealed or open, with or without air filtration or oxygen. The facemask 2, except for the viewing window 4 as will be further described below, is standard.

Referring to FIG. 2, the viewing window 4 is made of a clear member 10 and a layer of film 12, which is switchable on demand from a clear state to a light obscuring state, such as translucent or opaque state. The clear member 10 may be made of clear plastic or safety glass. The film 12 covers the area of the window 4 to contain the user's field of view. The film 12 is available from Glass Apps, Culver City, Calif., www.glass-apps.com. The film 12 is attached to an inside surface 14 of the clear member 10 by adhesive or other standard means.

Referring to FIG. 3, the film 12 may also be sandwiched between two clear members 10. In this arrangement, the film 12 is protected from wear and tear.

Referring to FIG. 4, the film 12 is made of liquid crystals 13 dispersed in a polymer 15 and sandwiched between two layers of conductive layers 17. When a voltage source 19 is applied across the film 12 through a switch 23, the liquid crystals 13 line up and are arranged in a regular manner, allowing light, generally depicted by the rays 21, to pass through uninterrupted. This is a transparent or clear state of the film 12 wherein the user can see out normally through the film 12 and the clear member 10. This is also a clear state of the viewing window 4, since the film 12 is disposed across the clear member 10.

Referring to FIG. 5, when the voltage source 19 is turned OFF, the liquid crystals 13 revert to their normal scattered positions, dispersing some light passing through the film 12 and reflecting some light back to the source. This is the light obscuring state of the film 12 when the film is translucent or opaque, wherein the user's field of vision to the outside is obscured. This is also a light obscuring state, such as translucent or opaque state, of the viewing window 4, since the film 12 is disposed across the clear member 10. By turning ON or OFF the voltage source 19, the viewing window 4 and the facemask 2 becomes switchable on demand between the clear state, when the user can see outside, and the light obscuring state, such as translucent or opaque state, when the user's field of view is obscured.

The ability of the facemask 2 to be switched from the clear state to the light obscuring state, such as translucent or opaque state, is advantageously useful for training personnel under conditions of smoke. Instead of generating simulated or artificial smoke, such by using dry ice and water, the facemask 2 becomes its own simulated smoke when it is switched to the light obscuring state, such as translucent or opaque state.

It should be understood that the amount of light that the film 12 will pass through when in the light obscuring state, such as translucent or opaque state, can be can specified at time of manufacture to simulate the amount and type of smoke that would be used for training. For example, for simulating very dense and black smoke, the film 12 may be designed to allow almost zero light. For simulated light smoke, the film may be made with 50-70% transmittance of light, making the film translucent. The amount of light transmittance will depend on the particular application of the film 12.

Referring to FIG. 1, a power source 16 is operably connected to the film 12. The power source 16 may be a standard 110 VAC. A portable power source 18 may be used in lieu of the standard power source 16 for field applications where a standard power outlet may not be available. A manual switch 20 operably connected to the power source 16 or 18 is provided to turn the power ON or OFF across the film 12. The switch 20 may be under the control of the user, allowing the user the choice on when to turn ON or OFF the power, and thus make the film 12 and the facemask 2 clear or light obscuring, such as translucent or opaque state. The switch 20 may be configured to vary the voltage across the film 12 and thus vary the degree of light obscuring state, such as transparent or opaque state, of the film 12. For example, the switch 20 might have settings at 10% intervals of maximum light obscuring state.

Referring to FIG. 1, a proximity switch 22 may be operably connected to the film 12. The proximity switch 22 will override the manual switch 20 in turning ON or OFF the voltage across the film 12. The operation of the proximity switch will be further discussed below.

A remote controlled wireless switch 24 that responds to a remote transmitter 26 may also be used that overrides the manual switch 20. The remote controlled wireless switch 24 and the remote transmitter 26 may be used for some applications requiring someone else other than the user of the facemask 2 to have control in switching the facemask 2 between the clear state and the light obscuring state, such as translucent or opaque state.

Referring to FIG. 6, an application of the facemask 2 is disclosed. A flight simulator 28 is shown with a pilot wearing the facemask 2 of the present invention. The viewing window 4 is shown in the light obscuring state to simulate smoke. A power cord 32 is operably connected to the film 12. The manual switch 20 may be under the control of a supervisor overseeing the simulator 28.

The simulator 28 may be used to train a pilot to deploy and use an emergency vision apparatus 34, as disclosed in U.S. Pat. No. 6,082,673.

Figure 7:
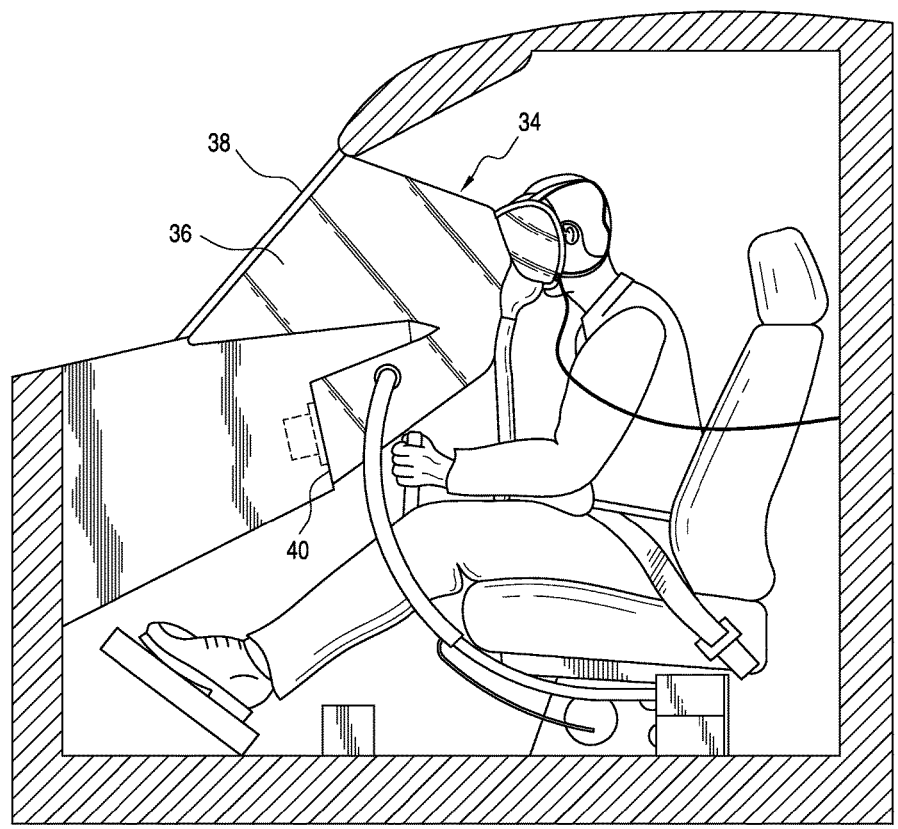
FIG. 7 is similar to FIG. 4, showing the facemask in a clear mode.

Referring to FIG. 7, the apparatus 34 includes an inflatable enclosure 36 with clear members at the front and rear to allow the pilot to see through the windshield 38 and instrument panel 40 during a smoke emergency. When not deployed, the inflatable enclosure 34 is deflated and stowed in a housing 42. For deployment, the enclosure 34 is inflated by battery operated blower 44 using filtered air from the environment.

Normally during training, simulated or artificial smoke is generated and fills the cockpit to simulate a smoke generating event. The artificial smoke is intended to obscure the normal vision of the pilot during operation of an aircraft. Artificial smoke may be made from dry ice and water. During the smoke event, the pilot then deploys the emergency vision apparatus 34.

With the use of the facemask 2, the need for generating artificial smoke inside the cockpit is eliminated. The ability of the facemask 2 to be switched from the clear state to the light obscuring state, such as translucent or opaque state, provides the vision obscuring character of artificial smoke. When it is decided to simulate a smoke event inside the simulator, the manual switch 20 is turned OFF, thereby turning the film 12, and thus the viewing window 4 of the facemask 2 into the light obscuring state, such as translucent or opaque state. This causes impairment to the pilot's field of vision, much like during a smoke emergency. The pilot then proceeds to deploy the inflatable enclosure 34 under light obscuring condition that simulates smoke in the cockpit. Once deployed, the pilot places the facemask 2 against the enclosure 34 to simulate the action of viewing the windshield 38 and the instrument panel 40 through the enclosure 34. Under actual smoke conditions, the pilot is able to see through the enclosure 34 to the windshield 38 and the instrument panel 40. To simulate this condition, the proximity switch 22 when placed near or against the enclosure 34 turns ON the power to switch the facemask 2 to the clear state, thereby restoring the pilot's vision through the viewing window 4.

The timing of when to turn the facemask 2 to the light obscuring state, such as translucent or opaque state, may be under the control of the flight simulator supervisor. With the use of a variable switch 20 that can vary the degree of light obscuring state, such as translucent or opaque state, of the film 12, the facemask 2 can simulate, for example, a light smoke at the start that gradually or rapidly becomes more dense over time, by gradually or rapidly increasing the percentage setting at the switch 20.

The facemask 2 has other applications outside of the flight simulator 28 environment. For example, the facemask 2 can be used for fire training. The facemask 2 equipped with portable power source 18 and the remote controlled switch 24 can be worn by fire fighters during training. To simulate smoke in the environment, the training supervisor overseeing the fire fighters can activate on demand the remote switch 24 with the transmitter 26 to turn the facemask 2 to the light obscuring state, such as translucent or opaque state. With a variable switch setting as disclosed above, the supervisor can choose to make light "smoke," heavy "smoke," or continuously increasing degree of "smoke" by dialing up on the switch setting.

Other applications may include situations where training is required under reduced lighting.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A switchable facemask, comprising:
   a) a viewing window through which a user views the outside, said viewing window including a clear member;
   b) a film operably disposed across said clear member to cover the user's field of view;
   c) a power source operably connected to said film;
   d) a first switch for turning ON or OFF said power source;
   e) said film is switchable between a clear state such that the user can see through the clear member and a light obscuring state such that the user's field of view is obscured;
   f) said film is in said clear state when said first switch is ON to turn ON the power source connected to said film, said film is in said light obscuring state when said first switch is OFF to turn OFF the power source; and
   g) a second switch configured to override said first switch in switching said film between said clear state and said light obscuring state.

2. A switchable facemask as in claim 1, wherein said film is a polymer dispersed liquid crystal film.

3. A switchable facemask as in claim 1, wherein said second switch is a proximity switch disposed on said facemask.

4. A switchable facemask as in claim 1, wherein said second switch is a remote controlled switch operable through a remote controller.

5. A switchable facemask as in claim 4, wherein said first switch is configured to select a degree of light obscuring state for said film between said clear state and a maximum light obscuring state.

6. A switchable facemask as in claim 1, wherein:
   a) said viewing window includes another clear member; and
   b) said film is disposed between said clear member and said another clear member.

7. A switchable facemask as in claim 1, wherein said film is disposed on an inner surface of said clear member.

8. A switchable facemask as in claim 1, wherein said first switch is configured to select a degree of light obscuring state for said film between said clear state and a maximum light obscuring state.

9. A method for training a person under conditions of smoke in an environment, comprising the steps of:
   a) providing a facemask for the person to wear, said facemask including a viewing window switchable between a clear state and a light obscuring state and a first switch for electrically switching said viewing window between said clear state and said light obscuring state;
   b) providing said facemask with a second switch configured to override said first switch to switch said viewing window between said clear state and said light obscuring state; and
   c) overriding said first switch with said second switch to switch said viewing window between said clear state and said light obscuring state.

10. A method as in claim 9, wherein said second switch is implemented with a proximity switch.

11. A method as in claim 9, and further comprising the step of selecting with said first switch a degree of said light obscuring state for said viewing window between said clear state and a maximum light obscuring state.

12. A method as in claim 11, wherein said step of selecting is implemented by varying a voltage across the viewing window.

13. A method as in claim 9, wherein said first switch is implemented with a remote switch.

14. A method as in claim 9, wherein said step of overriding occurs when said viewing window is in said light obscuring state.

15. A switchable facemask, comprising:
   a) a viewing window through which a user views the outside, said viewing window including a clear member;
   b) a film operably disposed across said clear member to cover the user's field of view;
   c) a power source operably connected to said film;
   d) a first switch for turning ON or OFF said power source;
   e) said film is switchable between a clear state such that the user can see through the clear member and a light obscuring state such that the user's field of view is obscured;
   f) said film is in one of said clear and light obscuring states when said first switch is ON, said film is in another of said clear and light obscuring states when said first switch is OFF;
   g) a second switch on said facemask, said second switch is configured to override said first switch in switching said film between said clear state and said light obscuring state.

16. A switchable facemask as in claim 15, wherein said second switch is a proximity switch disposed on said facemask.

17. A switchable facemask as in claim 15, wherein said second switch is a remote controlled switch operable through a remote controller.

18. A switchable facemask as in claim 17, wherein said remote controlled switch is disposed on said facemask.

19. A switchable facemask as in claim 15, where said first switch is configured to select a degree of light obscuring state for said film between said clear state and a maximum light obscuring state.

20. A switchable facemask, comprising:
   a) a viewing window through which a user views the outside, said viewing window including a clear member;
   b) a film operably disposed across said clear member to cover the user's field of view;
   c) a voltage operably connected to said film;
   d) a remote controlled switch for turning ON or OFF said voltage, said remote controlled switch being operable with a controller remote from the user;
   e) said film is switchable between a clear state such that the user can see through the clear member and a light obscuring state such that the user's field of view is obscured;
   f) said film is in one of said clear and light obscuring states when said remote controlled switch is ON, said film is in another of said clear and light obscuring states when said remote controlled switch is OFF; and
   g) said remote controlled switch is configured to vary said voltage to select a degree of light obscuring state for said film between said clear state and a maximum light obscuring state.

21. A switchable facemask as in claim 20, wherein said remote controlled switch is disposed on said facemask.

* * * * *